United States Patent [19]

Diantonio

[11] 3,946,858
[45] Mar. 30, 1976

[54] SELF-CAPTIVATING KEEPER FOR IDLER ROLLS

[75] Inventor: Daniel Joseph Diantonio, Nutley, N.J.

[73] Assignee: Litton Systems Inc., Passaic, N.J.

[22] Filed: Jan. 31, 1975

[21] Appl. No.: 545,805

Related U.S. Application Data

[63] Continuation of Ser. No. 389,163, Aug. 17, 1973, abandoned.

[52] U.S. Cl. .......................................... 198/192 R
[51] Int. Cl.² ....................................... B65G 39/12
[58] Field of Search ............ 198/191, 192 R; 193/37

[56] References Cited
UNITED STATES PATENTS

| | | | |
|---|---|---|---|
| 2,312,610 | 3/1943 | Weiss et al. ...................... | 198/192 R |
| 2,586,270 | 2/1952 | Spurgeon ......................... | 198/192 R |
| 2,843,432 | 7/1958 | Kindig ............................. | 198/192 R |
| 3,332,536 | 7/1967 | Ebly ................................. | 198/192 R |

Primary Examiner—Evon C. Blunk
Assistant Examiner—Jeffrey V. Nase
Attorney, Agent, or Firm—Morris I. Pollack

[57] ABSTRACT

A keeper for retaining opposite ends of a pair of idler rolls fixed within apertures in the first and second supports of a common bracket. Keeper is unitary rigid member including a planar body with a raised rib on its upper surface and a pair of shallow, substantially triangular legs depending therebelow. Such legs extend away from the body at an obtuse angle and the apex of each triangular leg is flattened slightly to form a run parallel to longitudinal dimension of the body so that legs can span the distance between the supports of the bracket and engage the wrench flats at the ends of a pair of idler rolls. Keeper is forced into locking position by simple manual tools, and once in position, the rib on the keeper is trapped between the opposite walls defining the apertures in the bracket and the reaction of the idler rolls presses on the legs of the keeper so that the keeper exhibits a self-captivating characteristic.

9 Claims, 6 Drawing Figures

SELF-CAPTIVATING KEEPER FOR IDLER ROLLS

This is a continuation of application Ser. No. 389,163, filed Aug. 17, 1973, now abandoned.

BACKGROUND OF THE INVENTION

1. Field of the Invention

The invention relates generally to keepers for idler rolls which lock the ends of a pair of adjacent rolls in fixed position within a bracket.

2. Description of the Prior Art

The desirability of providing a sturdy, inexpensive, easily insertable and removable device for retaining idler rolls in fixed position within a bracket has long been recognized. Several attempts have been made to realize these goals, although the most common approach has been to provide a resilient spring clip that is secured to the bracket and fits over the end cap of the idler roll to capture the roll within an aperture in the bracket. One particular clip configuration is disclosed in U.S. Pat. No. 3,157,272, granted Nov. 17, 1964, to James Bay.

The strength of such resilient clips, however, which make contact with the roll at a very limited area, is sorely limited, so that the vibrations encountered during transport of an idler roll assembly to a job site may cause the clip to spring out of locking position. Alternatively, the clip may be deformed and its strength and effectiveness further diminished. Also, two resilient clips are required for each roll, i.e., one clip for each end of the roll, and the insertion of a pair of clips into the closely spaced supports of an interior bracket of an idler roll set may prove to be difficult to accomplish.

Another common attempt to realize the goals set forth above has been to provide a rigid sheet metal clip having a planar body and a pair of depending legs. Ears or tabs are struck in the depending legs, and cooperating abutments are formed in the bracket adjacent to its upper end. The ends of adjacent rolls are positioned in the apertures in the bracket, and then the clip is forced downwardly over the caps until the ears and abutments interengage to lock the rolls in fixed position within the bracket. A representative clip configuration is disclosed in U.S. Pat. No. 2,843,432, granted July 15, 1958 to A. J. Kindig.

While one rigid clip can hold a pair of rolls in fixed position, and the rigid clip is thus better suited for use with the interior brackets on an in-line, idler roll assembly, such as used in a troughing conveyor, the clip disclosed in the Kindig patent necessitates the modification of existing brackets to form abutments thereon, or alternatively, the manufacture of new brackets with such abutments. Furthermore, the insertion and removal of such clips may be difficult where the vertical spacing between the underside of the conveyor belt and the upper end of the central bracket is limited.

SUMMARY

Thus, with the defects of known securing devices for idler rolls clearly in mind, the instant invention contemplates an inexpensive rigid metal keeper that is sturdy, can positively retain adjacent rolls in fixed position within appropriate apertures in a bracket, will not work free even during transport to the job site, and yet is compatible with the vast majority of existing brackets. Such metal keeper can be installed in a horizontal direction within limited clearances between the supports of a central bracket. Additionally, once the instant keeper is installed with simple manual tools, it exhibits a self-captivating ability and can only be removed by the application of horizontally directed forces preparatory to the replacement or repair of the idler rolls.

Other desirable objectives achieved by the unique keeper will become readily apparent from the ensuing description when construed in harmony with the appended drawings.

DESCRIPTION OF PREFERRED EMBODIMENT

Figure 1:
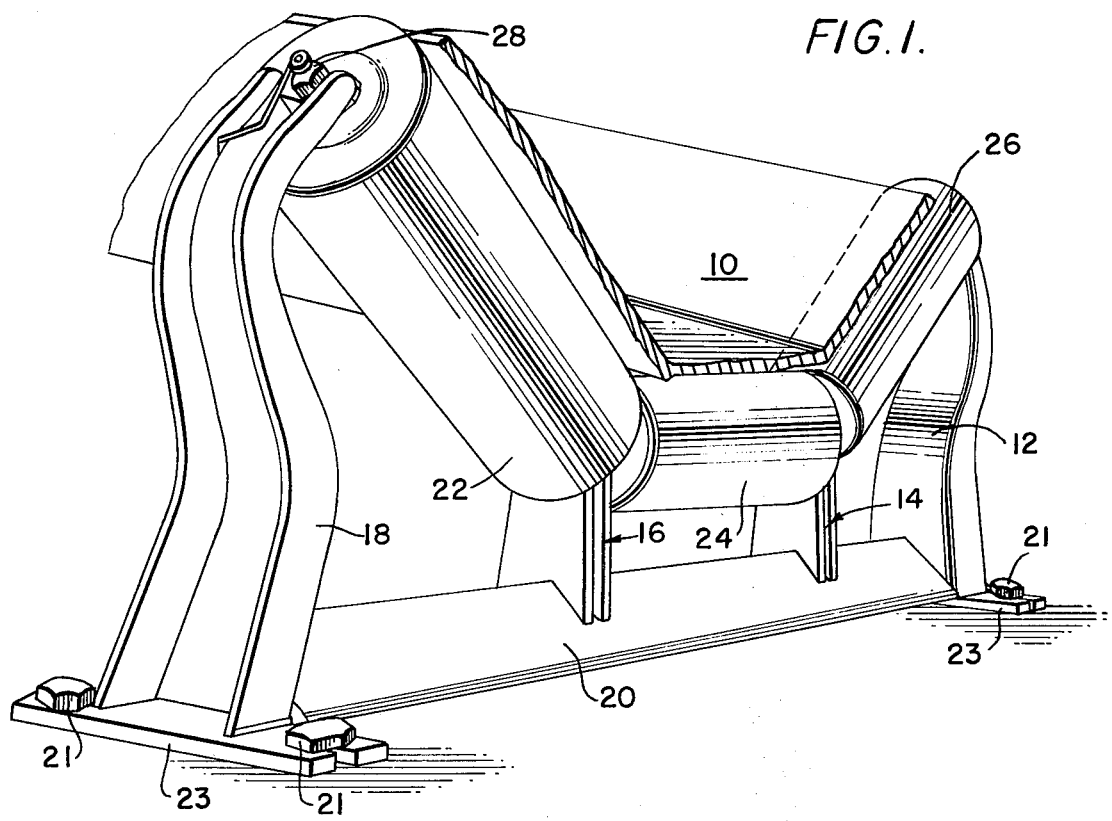
FIG. 1 is a perspective view of an idler roll set supporting a conveyor belt thereupon.
Figure 2:
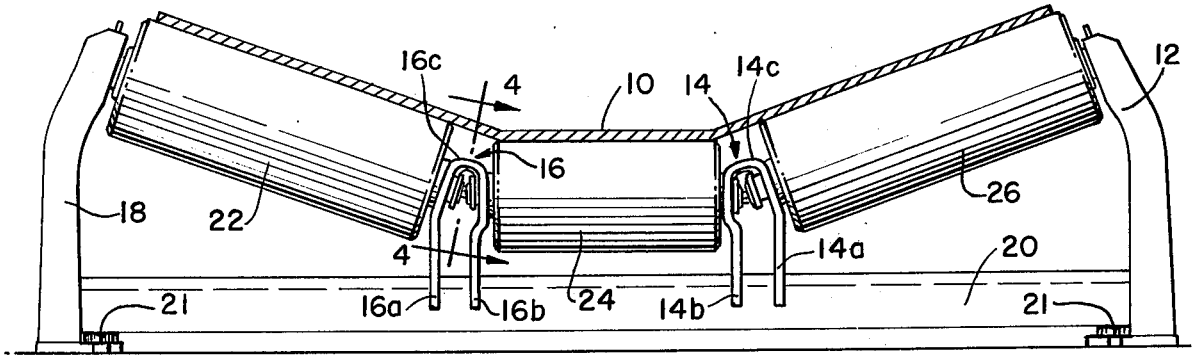
FIG. 2 is a front elevational view, on a reduced scale, of the idler roll set of FIG. 1.

Referring now to the drawings, FIGS. 1 and 2 depict an idler roll set within which the keeper of the instant invention finds particular applicability. The upper run of a conveyor belt 10 is entrained over the idler roll set to define a troughing conveyor. The idler roll set comprises a right end bracket 12, a first interior bracket 14, a second interior bracket 16, and a left hand end bracket 18. A channel 20 extends between the end brackets and supports the interior brackets 14 and 16. Bolts 21 passing through the longitudinal braces 23 at the base of end brackets 12 and 18 are employed to secure the idler roll set in fixed position.

FIG. 2 also clearly shows that interior bracket 14 comprises a first support 14a and a second support 14b interconnected by a continuous loop 14c. Bracket 16 also comprises a first support 16a, a second support 16b, and a continuous loop 16c, but support 16 is the mirror-image of support 14. The supports are angularly disposed relative to one another to accommodate rolls held at various angular orientations to achieve troughing of belt 10. As indicated by the dotted lines in FIG. 4, a substantially U-shaped, upwardly opening aperture 16d is defined at the upper ends of supports 16a, 16b; a similar aperture is defined at the upper ends of supports 14a, 14b. The dimensions of the apertures are chosen to be slightly larger than the dimensions of the wrench flats 25 (see FIG. 5) defined at opposite ends of the central shaft passing laterally through the idler rolls, so that the flats 25 can easily be inserted into the aperture and follow the U-shaped contour of its walls. A collar 27 is situated at opposite ends of the central shaft so that the idler roll cannot be forced laterally out of the aperture within which flats 25 are seated. Although flats 25 and collar 27 are described as separate components, a multi-purpose end cap of conventional design could readily perform both of these functions.

Figure 3:
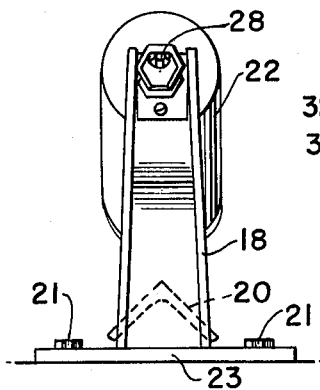
FIG. 3 is a side elevational view of an end bracket of the idler roll set.

One end of a first canted idler roll, or wing roll, 22 is seated in an aperture in end bracket 18, and the opposite end is seated in an aperture in support 16a of interior bracket 16. The outer end of idler roll 22 is secured in position in a conventional fashion (not shown). One end of second idler roll 24, which extends laterally between the wing rolls, is seated in an aperture in support 16b and the opposite end of roll 24 is seated in an aperture in support 14b of bracket 14. The inner end of a second canted idler roll, or wing roll, 26 is seated in an aperture in support 14a of bracket 14, and the outer end of roll 26 is seated in an aperture in outer bracket 12. Conventional means are used to secure the outer end of roll 26 within the aperture in bracket 12. Since rolls 22 and 26 are mounted at an acute angle to the plane passing laterally through roll 24, belt 10 assumes a concave configuration. A grease fitting 28 is located at the outer end of roll 22 and a similar fitting (not shown) is located at the outer end of roll 26 so that the idler roll set can be lubricated at either lateral end thereof. FIG. 3 shows additional details of end bracket 18 and grease fitting 28 in relation to idler roll 22.

Figure 4:
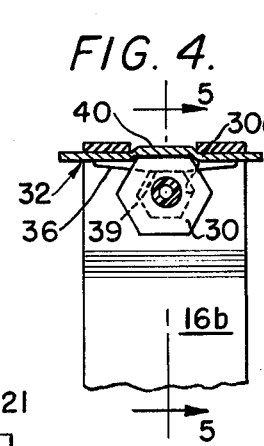
FIG. 4 is a fragmentary side elevational view of a keeper in locking position within an interior bracket of the idler roll set, such view being taken along line 4—4 in FIG. 2 and in the direction indicated.
Figure 5:
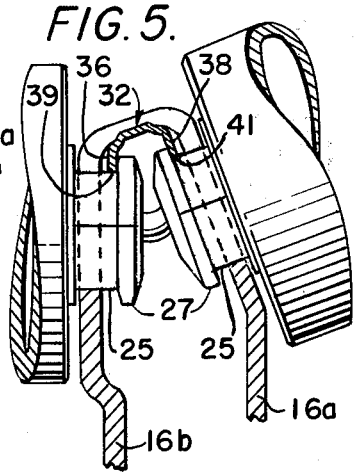
FIG. 5 is a cross-sectional view of the keeper, end cap and interior bracket of FIG. 4, such view being taken along line 5—5 of FIG. 4 and in the direction indicated.
Figure 6:
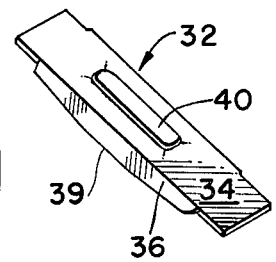
FIG. 6 is a perspective view of the keeper constructed in accordance with the principles of the instant invention.

FIGS. 4-6 reveal a keeper, indicated generally by reference numeral 32, constructed in accordance with the principles of the instant invention. Keeper 32 is a unitary, rigid metal member including a sturdy, substantially rectangular body 34 with a pair of legs 36,38 of shallow, substantially triangular configuration extending therebelow. The apex of each triangular leg is foreshortened to provide a run 39,41 that parallels the longitudinal extent of body 34. The runs are of sufficient length so that a relatively large area of contact will be defined between the keeper and the wrench flats on the roll shafts. When viewed in end elevation as in FIG. 5, legs 36,38 diverge slightly outwardly from the body at an obtuse angle so that the lateral span between the lower ends of the legs exceeds the lateral dimension of the body 34 of the keeper.

An upstruck rib 40 interrupts the upper surface of body 34. The longitudinal dimension of rib 40 is chosen to be slightly less than the longitudinal distance between the opposing walls that define the apertures in the supports and interconnecting loops of interior brackets 14 and 16. Accordingly, as depicted in FIG. 4, when keeper 32 is driven into locking position within the bracket, rib 40 is trapped between the opposing walls and runs 39,41 on depending legs 36,38 rest upon flats 25 on the ends of adjacent rolls retained within the interior brackets. The reaction of the free end of each roll exerts an upward lifting force on the end of each roll seated within the apertures in the supports of the interior brackets; such lifting force is transmitted to the legs of the keeper and presses the upper surface of body 34 firmly against the underside of the loops, such as 14c and 16c, that laterally span and interconnect the supports of the interior bracket. The interaction between the lifting force applied to the keeper, once inserted into operative position, and the entrapment of rib 40 between the opposing walls that define the apertures, contribute to the self-captivating characteristic of the instant keeper. Phrased in another manner, once keeper 32 is driven into operative position by simple manual tools, it cannot work its way free but must be driven from its operative position by manipulation of the simple manual tools, such as a hammer, etc.

The structural configuration of the instant keeper, and the functional advantages attributable thereto, is susceptible of minor changes and modifications which fall within the inventive scope of this application. To illustrate, with slight modification, the keeper could be used with brackets of different design and with idler rolls of sundry configurations. Consequently, it is submitted that the appended claims should not be severely limited to their literal terms, but should be accorded an interpretation commensurate with the technical advance in the conveyor art represented by the instant keeper.

I claim:

1. A support and keeper assembly for a roll shaft: comprising
   a. support means carrying at least a seat and provided with at least an aperture through which at least a portion of a roll shaft may enter to be received by said seat;
   b. said support means further extending into substantially horizontally disposed abutment means proximate to and on each side of said aperture and raised with respect to said aperture and seat; and
   c. keeper means of a configuration having a top surface and a bottom surface and being of an extent sufficient to span said aperture and to be housed between said abutment means and a portion of the roll shaft when disposed in said seat, so that said top surface is disposed beneath and for coaction with said substantially horizontally disposed abutment means and so that said bottom surface is disposed above and for coaction with the portion of the roll shaft, to prevent movement of the portion of the roll shaft upwardly out of said seat and through said aperture.

2. The support and keeper assembly of claim 1 wherein detent means are provided between said keeper means and said abutment means.

3. The support and keeper assembly of claim 2 wherein said detent means comprises a rib carried by said keeper means for co-operation with an opening formed in said abutment means.

4. The support and keeper assembly of claim 1 wherein,
   a. said support means includes a first support provided with a first aperture and a first seat for receiving a portion of a first roll shaft;
   b. said support means further including a second support provided with a second aperture and a second seat for receiving a portion of a second roll shaft; and
   c. said abutment means comprising a continuous loop spanning said first support and said second support.

5. The support and keeper assembly of claim 4 wherein said keeper includes a projection and said abutment means includes an opening disposed for co-operation with said projection to detent said keeper in position.

6. The support and keeper assembly of claim 5 wherein said continuous loop is formed as two loop like member spanning said first support and said second support each such loop like member being to one said of said aperture so as to form said opening therebetween.

7. The support and keeper assembly of claim 1 wherein said keeper means is provided with leg means and wherein the spacing between said seat and said abutment is less then the extent of said legs and the size of the roll shaft portion to be received in said seat so that said keeper must be forced into place.

8. The support and keeper assembly of claim 7 wherein said keeper includes an upstanding rib and said abutment includes an opening for receiving said upstanding rib after said keeper has been forced into place and so that said keeper is detented into position.

9. An idler roll set comprising, in combination,
  a. a bracket having a first and a second support interconnected by a continuous loop that spans the lateral distance between said supports,
  b. said first and said second supports having upwardly opening apertures defined therein,
  c. idler rolls having flattened surfaces defined at each end thereof,
  d. said surfaces being insertable into said apertures in a vertical direction so that opposite ends of a first and a second idler roll are positioned adjacent to one another within said bracket,
  e. said loop having a central portion removed therefrom so that a continuous opening extends throughout said first support, said loop, and said second support, and
  f. a keeper having a rigid rectangular body, a pair of legs depending therebelow, and a rib formed atop its body with the longitudinal extent of said rib being slightly less than the longitudinal dimension of said opening,
  g. said keeper being forced into said bracket in a longitudinal direction substantially parallel to said loop so that said body spans the lateral distance between the supports, said depending legs firmly engage the surfaces on opposite ends of the first and second idler rolls, and so that said rib is captured within the walls defining said openings.

* * * * *